(12) United States Patent
Maruta et al.

(10) Patent No.: US 7,554,702 B2
(45) Date of Patent: Jun. 30, 2009

(54) IMAGE INPUT APPARATUS

(75) Inventors: Toshihiro Maruta, Kanagawa (JP); Hironori Shimada, Kanagawa (JP); Mitsuo Shimizu, Kanagawa (JP); Naoto Terashima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 946 days.

(21) Appl. No.: 11/010,447

(22) Filed: Dec. 14, 2004

(65) Prior Publication Data
US 2005/0128533 A1    Jun. 16, 2005

(30) Foreign Application Priority Data
Dec. 15, 2003    (JP)    ............... 2003-417183

(51) Int. Cl.
*H04N 1/04*    (2006.01)
(52) U.S. Cl. ............... 358/474; 358/475; 358/496; 358/497
(58) Field of Classification Search ............... 358/474, 358/475, 496, 497
See application file for complete search history.

(56) References Cited

U.S. PATENT DOCUMENTS

2001/0020317 A1 *  9/2001  Heisig et al.  ............... 16/243

FOREIGN PATENT DOCUMENTS

| JP | 53-133319 | 11/1978 |
|---|---|---|
| JP | UM61-002616 | 1/1986 |
| JP | 64-072655 A | 3/1989 |
| JP | 06-121109 | 4/1994 |
| JP | 06-311310 | 11/1994 |
| JP | 07-183993 | 7/1995 |
| JP | 10-294827 A | 11/1998 |
| JP | 2000-307271 | 11/2000 |
| JP | 2002-168922 | 6/2002 |
| JP | 2003-110800 | 4/2003 |
| JP | 2003-115978 | 4/2003 |

OTHER PUBLICATIONS

Japanese Office Action with English translation, dated Jan. 17, 2008.

* cited by examiner

*Primary Examiner*—Houshang Safaipour
(74) *Attorney, Agent, or Firm*—Morgan, Lewis & Bockius LLP

(57) ABSTRACT

The present invention provides an image input apparatus. The image input apparatus includes a board having an image sensor; a supporting member having a first supporting portion and a second supporting portion; a first fastening member; and a second fastening member. The image input apparatus is characterized in that the board is rigidly secured on the first supporting portion of the supporting member with the first fastening member installed in the first supporting portion, and the board is movably supported on the second supporting portion of the supporting member by the second fastening member installed in the second supporting portion.

16 Claims, 20 Drawing Sheets

IMAGE INPUT APPARATUS

The entire disclosure of Japanese Patent Application No. JP 2003-417183 filed on Dec. 15, 2003 including specification, claims, drawings and abstract is incorporated herein by reference in its entirety.

BACKGROUND OF THE INVENTION

1. Field of the Invention

The present invention relates to an image input apparatus for optically obtaining data from a paper document.

2. Description of the Related Art

A typical image input apparatus for optically obtaining data from a paper document includes a photocopier and an image scanner. Data from a paper document is input to the image input apparatus. Light emitted from an illumination lamp is reflected from the paper document, and the reflected light is converted to electrical signals in an image sensor having an imaging device element such as a CCD (Charge Coupled Device).

Patent publication JP-A-10-294827 discloses a typical method of installing such an image sensor in an image input apparatus. In the method, an image sensor is installed in an image input apparatus in a two-step manner. First, an image sensor is secured on a plate-like circuit board. Next, the circuit board is secured on a supporting member, such as a bracket, and then is secured in an image input apparatus with a fastening member such as a screw.

Another patent publication JP-A-64-72655 discloses a method of installing an image sensor in an image input apparatus. In the method, melted adhesive material, such as epoxy-type resin, having a thermally tolerant property, is filled to form a layer of adhesive material between an image sensor and a lens casing for supporting a lens, and the image sensor is secured in the image input apparatus by solidification of the adhesive material.

As disclosed in the patent publication JP-A-10-294827, the internal temperature of an image input apparatus changes depending on heat generated in an image sensor or in other components installed on a circuit board, or depending on changes in ambient temperature. The plate-like circuit board includes a circuit pattern layer and a base layer. When temperature of the circuit board changes the circuit board expands or contracts due to differences in thermal expansion coefficients of different layers. This expansion/contraction leads to a situation that the circuit board becomes bent or warped. In such a situation, the position of the image sensor installed on the circuit board is deviated along the optical axis of the lens. More specifically, when the internal temperature of the apparatus rises due to heat generated in the components installed on the circuit board, the circuit board tends to change its shape in such a manner that the image sensor is displaced in a the opposite direction from the lens. On the contrary, when the internal temperature decreases, the circuit board tends to change its shape in such a manner that the position of the image sensor deviates in a direction toward the lens. If the circuit board changes its shape as described above and the position of the image sensor deviates, light reflected from the paper document cannot be focused onto the image sensor precisely. Accordingly, the quality of input images is degraded.

Next, according to the method disclosed in the patent publication JP-A-64-72655, an image sensor is secured to a lens casing by means of a layer of adhesive material; therefore displacement along the optical axis due to temperature change may be reduced to a level less than that of the configuration disclosed in the patent publication JP-A-10-294827. However, if a rapid hardening type of adhesive material is used, the dimension of the layer drastically changes after hardening. Thus, a tedious optical alignment becomes necessary. If adhesive materials used show less change of their dimensions during a hardening process, longer time is required until the layer becomes solid. Thus productivity is degraded.

Further, according to a method disclosed in the patent publication JP-A-64-72655, the image sensor is fixed with a resin; accordingly it is more difficult to remove the image sensor than in the case of using a fastening member such as a screw. Thus, an image sensor fixed according to this method is less environmentally friendly, since it is difficult to recycle the image sensor.

SUMMARY OF THE INVENTION

The present invention has been made in view of the above circumstances and provides an image input apparatus.

According to an aspect of the present invention, the image input apparatus has a board having an image sensor; a supporting member having a first supporting portion and a second supporting portion; a first fastening member; and a second fastening member, and is characterized in that the board is rigidly secured on the first supporting portion of the supporting member with the first fastening member installed in the first supporting portion, and the board is movably supported on the second supporting portion of the supporting member by the second fastening member installed in the second supporting portion.

Accordingly, degradation of input image due to temperature change can be reduced in an image input apparatus without degrading productivity.

BRIEF DESCRIPTION OF THE DRAWINGS

Embodiments of the present invention will be described in detail based on the following figures, in which sizes of components and/or ratio between components are arbitrarily modified to make the components clearly visible, wherein.

DETAILED DESCRIPTION OF THE INVENTION

A description will be given in detail of the significant part of the image input apparatus according to embodiments of the present invention.

Especially, an image sensor and its peripheral components will be described, since they are crucial for capturing light reflected from a paper document. It is to be noted that the image input apparatus according to embodiments of the present invention may include other components commonly used in this and similar fields for obtaining image data from electrical signals generated in an image sensor.

A. First Embodiment

Figure 1:
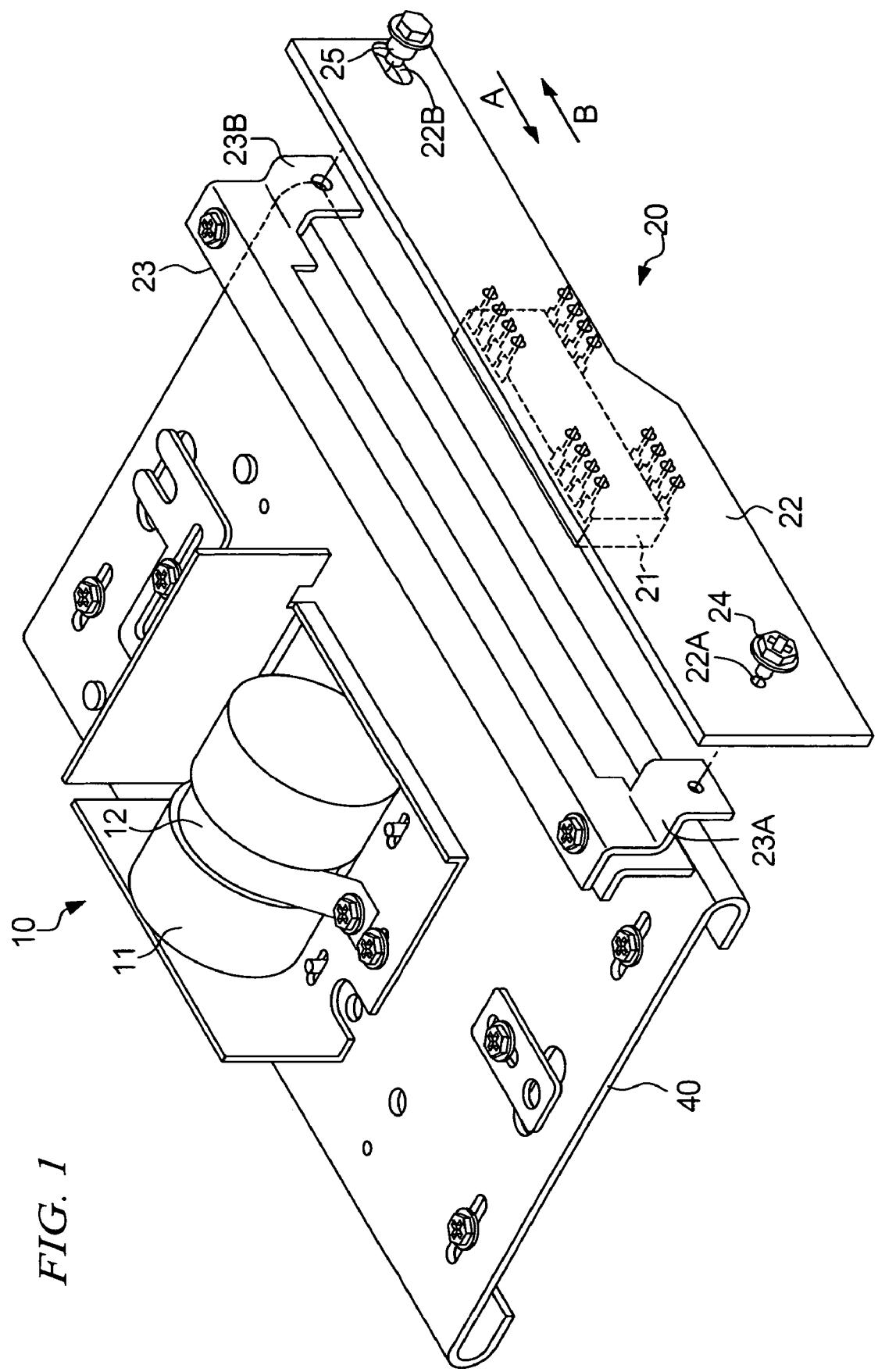
FIG. 1 is a perspective drawing illustrating a significant part of an image input apparatus according to a first embodiment of the present invention.

FIG. 1 illustrates a perspective view of the significant part of an image input apparatus according to a first embodiment of the present invention.

According to the present embodiment, shown in FIG. 1, an image input apparatus includes a focusing lens unit 10 functioning as a main component for focusing light reflected from a paper document, an image capturing unit 20 for capturing the light image of the paper document, and a base unit 40 for supporting the focusing lens unit 10 and the image capturing unit 20.

The focusing lens unit 10 includes a lens unit 11 and a lens bracket 12. The lens unit 11 includes multiple lenses for focusing light reflected from the paper document. The lens unit 11 is secured by the lens bracket 12 at a prescribed position on the base unit 40.

The image capturing unit 20 includes an image sensor 21 having an imaging device element such as a CCD, a circuit board 22, and a bracket 23.

The image sensor 21 is installed on the circuit board 22, and the circuit board 22 is secured to the bracket 23.

The circuit board 22 has a plate-like shape and is made of plastics. A circuit pattern is formed on the circuit board 22 with a copper foil. The image sensor 21, as well as electronic components for driving the image sensor 21 (not shown), are installed on the circuit board 22.

The circuit board 22 has a through hole 22A having a circular shape (circular through hole 22A) and a through hole 22B having an oval shape (oval through hole 22B). The circular through hole 22A is used to secure the circuit board 22 to the bracket 23 with a fastening member such as a screw. The oval through hole 22B is used to support the circuit board 22. As shown in FIG. 1, the longitudinal direction of the oval coincides with the longitudinal direction of the circuit board 22. The shape of the through hole 22B is not limited to the shape shown in FIG. 1. The through hole 22B may have, for example, a rectangular shape.

Figure 2:
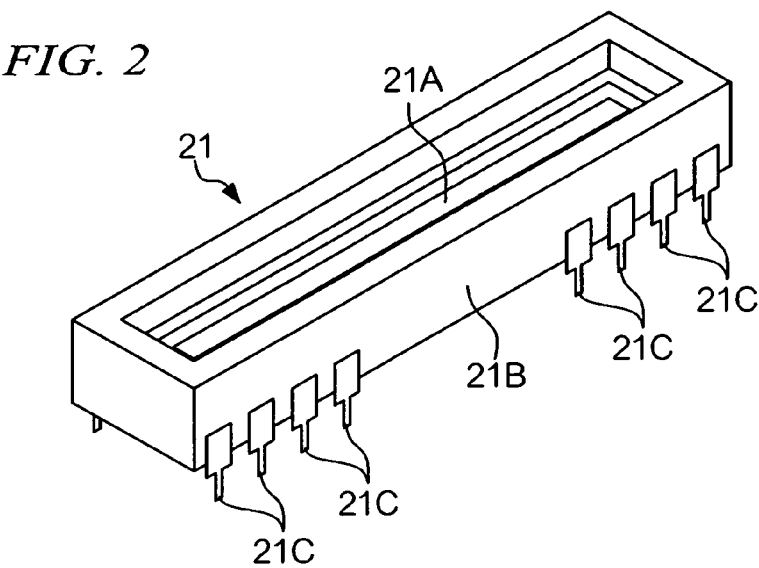
FIG. 2 is a perspective drawing illustrating an image sensor according to the same embodiment.

The image sensor 21 converts the light image focused by means of the lens unit 11 to electrical signals. Image sensor 21 includes multiple imaging device elements 21A, such as CCD line sensors. Multiple imaging device elements 21A are disposed along a longitudinal direction of image sensor 21, and captures light from lens unit 11. As shown in FIG. 2, the multiple imaging device elements 21A are enclosed by package 21B. Package 21B is made from, for example, ceramic material or plastics.

Image sensor 21 has terminals 21C outputting electrical signals and inputting drive signals for driving multiple imaging device elements 21A.

By soldering terminals 21C on a circuit pattern formed on circuit board 22, image sensor 21 is installed on the circuit board 22 The circuit pattern is formed on circuit board 22 in a manner that the longitudinal direction of image sensor 21 is aligned to the longitudinal direction of circuit board 22.

Figure 3A:
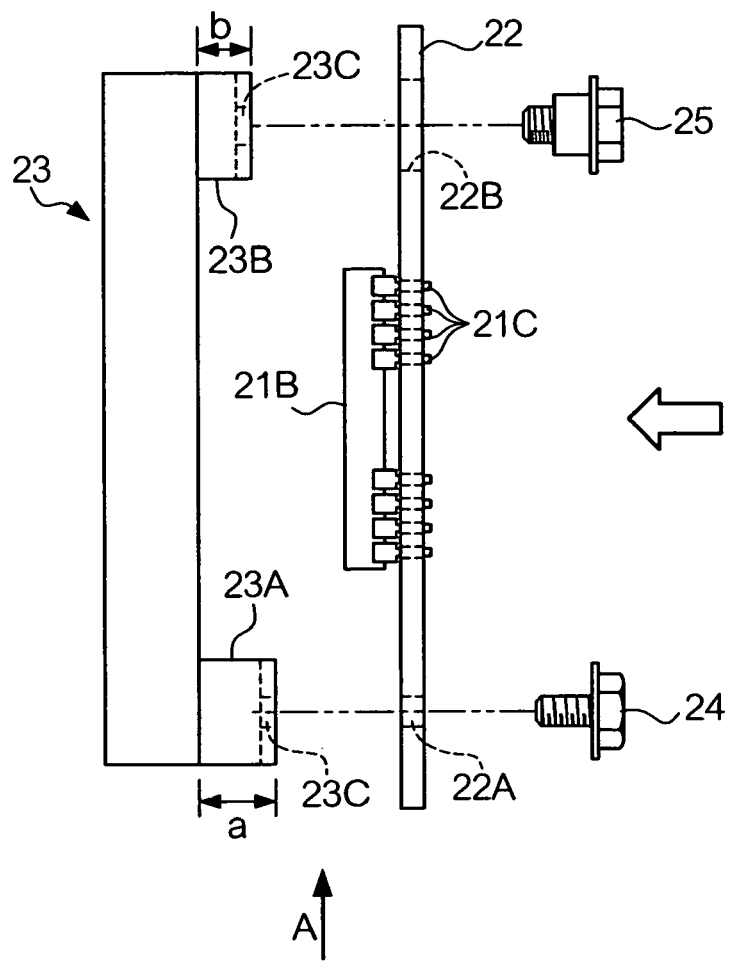
FIGS. 3a and 3b are schematic drawings illustrating circuit board 22 and bracket 23 according to the same embodiment.
Figure 3B:
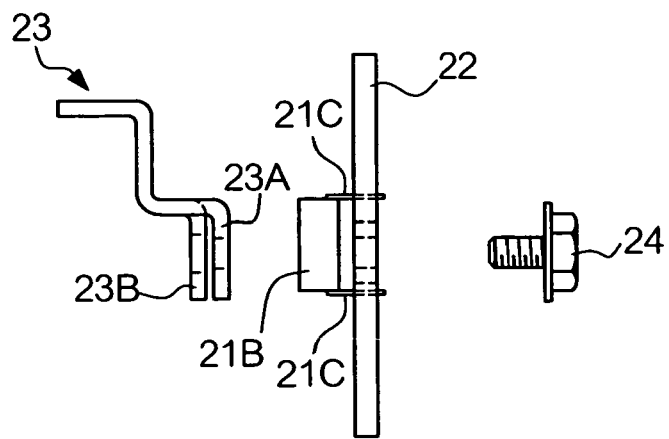

The bracket 23 is made of, for example, a pre-shaped metal plate by using a sheet metal processing. The bracket 23 is secured to base unit 40 with a fastening member such as a screw. In the right and left end portions along a longitudinal direction of bracket 23, supporting portion 23A and supporting portion 23B are disposed for supporting circuit board 22. Supporting portions 23A and 23B are set to protrude in the same side of bracket 23 facing circuit board 22. As shown in FIGS. 3a and 3b, the degree of protrusion of supporting portion 23A differs from that of supporting portion 23B, and supporting portion 23A protrudes further than supporting portion 23B. Supporting portions 23A and 23B have threaded screw hole 23C. Bracket 23 may be made not only from metal but from other materials such as plastics.

Figure 4:
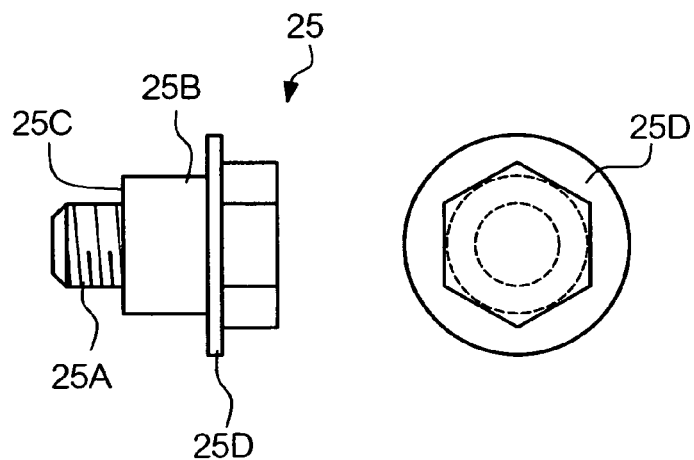
FIG. 4 is a drawing illustrating an outline of screw 25 according to the same embodiment.

Screw 24 has a similar shape to that of an ordinary screw, and is used to secure circuit board 22 to bracket 23. As shown in FIG. 4, sleeve screw 25 has a threaded portion 25A and an unthreaded portion 25B. The height of unthreaded portion 25B of sleeve screw 25 in the axial direction is greater than the thickness of circuit board 22, and the diameter of unthreaded portion 25B is greater than the diameter of threaded screw hole 23C into which threaded portion 25A is screwed. Accordingly, when sleeve screw 25 is installed into threaded screw hole 23C, the installation of sleeve screw 25 is stopped at the edge surface 25C of unthreaded portion 25B. The diameter of unthreaded portion 25B is smaller than the smallest diameter of oval through hole 22B.

Circuit board 22 is secured to bracket 23 as follows. First, screw 24 is inserted into circular through hole 22A, and is screwed into threaded screw hole 23C of supporting portion 23A. Thereby, circuit board 22 is secured to supporting portion 23A of bracket 23. Since supporting portion 23A protrudes further than supporting portion 23B in the present state, a gap exists between the plate-like circuit board 22 and supporting portion 23B.

Next, sleeve screw 25 is inserted into oval through hole 22B, and threaded portion 25A of sleeve screw 25 is screwed into threaded screw hole 23C of supporting portion 23B. Accordingly, a position of circuit board 22 is determined and circuit board 22 is supported by screw 25.

When threaded portion 25A is screwed into threaded screw hole 23C as described above, installation of sleeve screw 25 is stopped at edge surface 25C of unthreaded portion 25B, since the diameter of unthreaded portion 25B is larger than the diameter of threaded screw hole 23C. Since the height of unthreaded portion 25B in the axial direction is larger than the thickness of circuit board 22, even when sleeve screw 25 is screwed into threaded screw hole 23C and the vicinity area of oval through hole 22B of circuit board 22 is pressed against bracket 23 by washer 25D, circuit board 22 is not pressed against supporting portion 23B, and the gap between circuit board 22 and supporting portion 23B is maintained. Since the smallest diameter of oval through hole 22B is larger than the diameter of unthreaded portion 25B, the same end portion of circuit board 22 as oval through hole 22B is movably supported while pressed toward bracket 23 with the edge surface of washer 25D. Sleeve screw 25 may be screwed into threaded screw hole 23C without pressing against circuit board 22 with washer 25D by elongating the height of unthreaded portion 25B in the axial direction. According to this modification, the same end portion of circuit board 22 as oval through hole 22B becomes movable also in the oppositional direction toward bracket 23.

In related art, a circuit board is secured to a bracket with screws. When a temperature of the circuit board changes, circuit board 22 cannot expand or contract without bending.

On the contrary, circuit board 22 may be protected from bending in the above-described image input apparatus, even when the temperature of circuit board 22 changes and circuit board 22 expands or contracts.

Specifically, circuit board 22 is secured with screw 24 at one end portion along a longitudinal direction, and is movably secured at another end portion. Accordingly, when a temperature of circuit board 22 changes, circuit board 22 may expand in the direction of arrow B, or may contract in the direction of arrow A, as shown in FIG. 1. The smallest diameter of oval through hole 22B is greater than the diameter of unthreaded portion 25B of sleeve screw 25, thus there exists a gap between the inner rim of oval through hole 22B and unthreaded portion 25B of sleeve screw 25.

Accordingly, when circuit board 22 expands in the direction of arrow B, oval through hole 22B moves in the direction of arrow B. When circuit board 22 contracts in the direction of arrow A, oval through hole 22B moves in the direction of arrow A. Thus, according to the present embodiment, even when a temperature of circuit board 22 changes, circuit board 22 may freely expand or contract, and be prevented from being bent.

Accordingly, circuit board 22 does not bend, thus, the deviation in the position of image sensor 21 along the optical axis of lens unit 11 may be reduced. Also degradation of input image quality can be reduced.

According to the present embodiment, circuit board 22 is easily secured to bracket 23 with screws. Thus, installation time of circuit board 22 may be reduced. Accordingly, image input apparatus is produced without degrading productivity. Since circuit board 22 is secured to bracket 23 with screws, circuit board 22 may also be easily removed from bracket 23, Accordingly, circuit board 22 according to the present embodiment is environment-friendly, since it may be easily recycled or reused.

Modifications To First Embodiments

Image sensor 21 may have reference imaging device element 21A, which is used as a reference point for capturing a focused image.

Reference imaging device element 21A may be disposed on the same end of circuit board 22 as circular through hole 22A. In the example shown in FIG. 1, a first segment of image sensor 21 acts as reference imaging device element 21A When a temperature of circuit board 22 changes, it expands in the direction of arrow B, or contracts in the direction of arrow A, as shown in FIG. 1. According to this modification, the deviation in a position of a first segment of image sensor 21 is reduced, and degradation of input image quality due to temperature change can be reduced.

Figure 5:
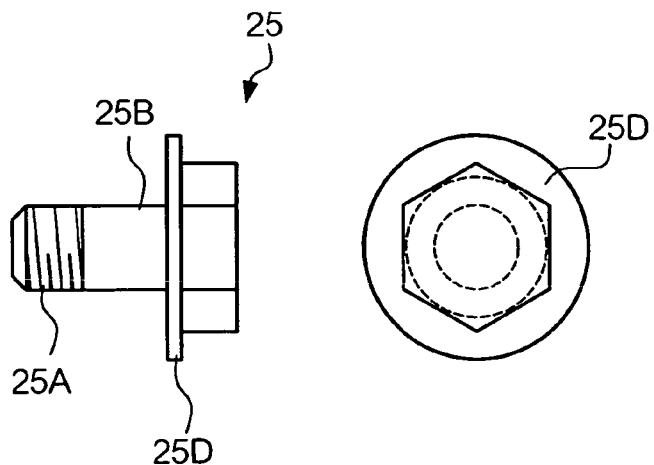
FIG. 5 is a drawing illustrating an outline of screw 25 according to a modification of the same embodiment.

Threaded portion 25A and unthreaded portion 25B of sleeve screw 25 may be of equal diameter. As shown in FIG. 5, any type of screw able to support circuit board 22 may be used. The screw inserted into oval through hole 22B is not limited to sleeve screw 25, and other shapes of screws may be used for this purpose.

Figure 6:
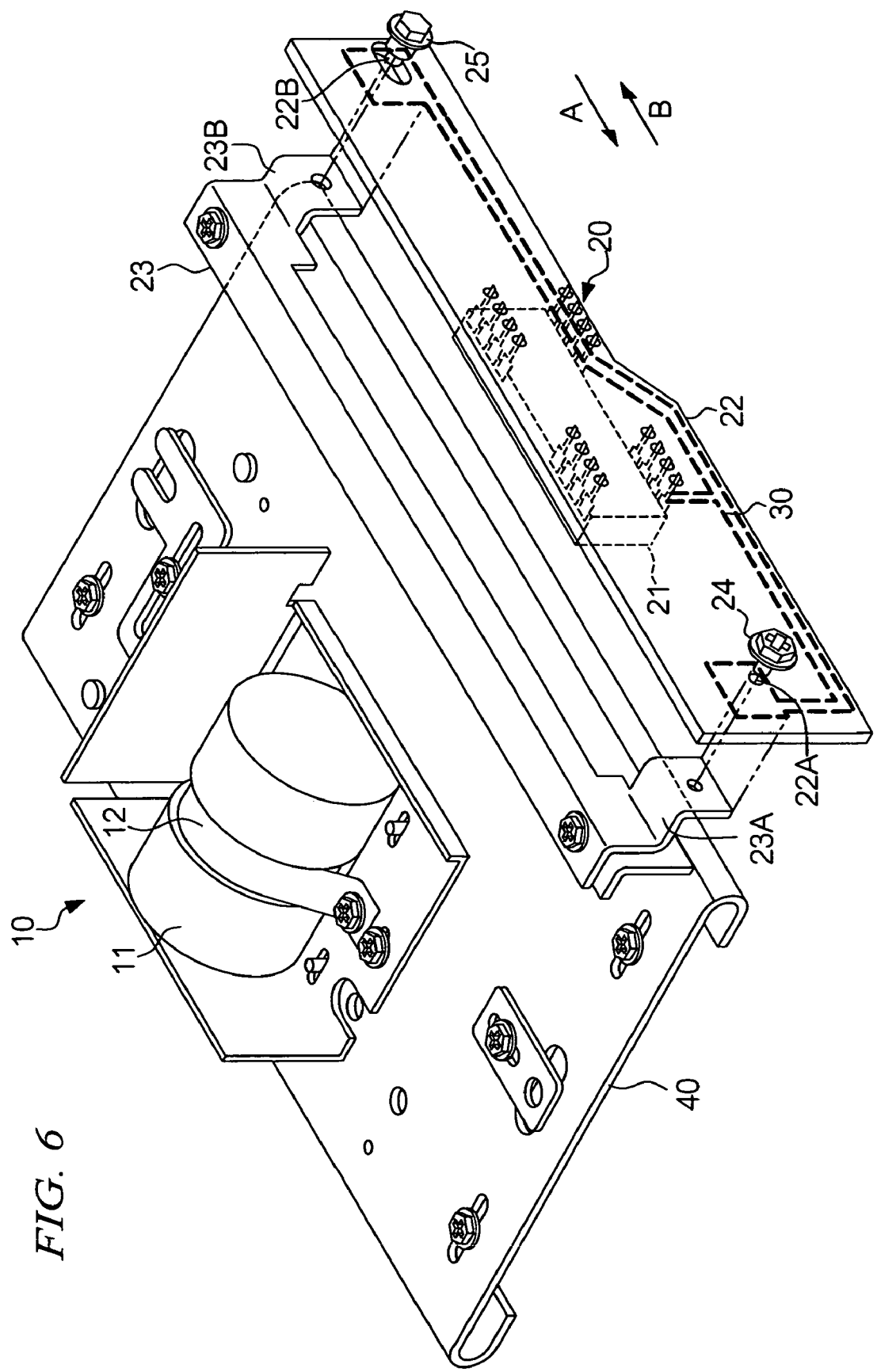
FIG. 6 is a perspective drawing illustrating an image input apparatus according to a modification of the same embodiment, wherein GND pattern 30 is formed on circuit board 22 in the portion pressed against supporting member 23A of bracket 23.

As shown in FIG. 6, ground pattern 30 (GND pattern 30) of a circuit pattern on circuit board 22 may be formed in the portion of circuit board 22 pressed with screw 24 against supporting portion 23A of bracket 23.

GND pattern 30 may be disposed in the portion where screw 24 contacts with circuit board 22. According to these modifications, GND pattern 30 of the circuit pattern and bracket 23 made of metal, or base unit 40 made of metal are electrically connected, thus effective area of GND pattern 30 is enlarged. Accordingly, electromagnetic noise from circuit board 22 can be reduced.

Figure 7A:
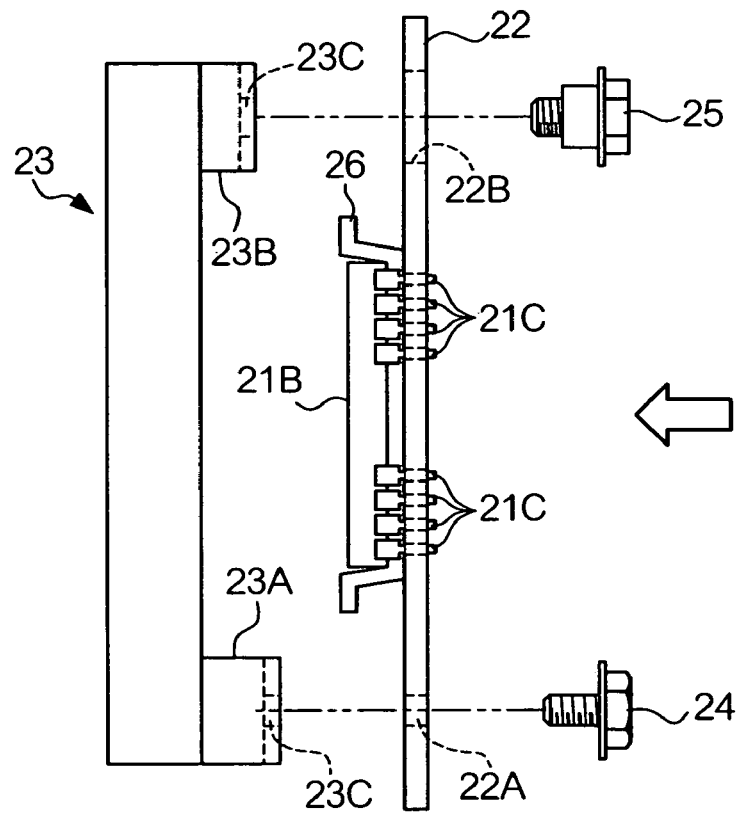
FIGS. 7a and 7b are schematic drawings illustrating circuit board 22 and bracket 23 according to a modification of the same embodiment, wherein heat sink 26 is placed.
Figure 7B:
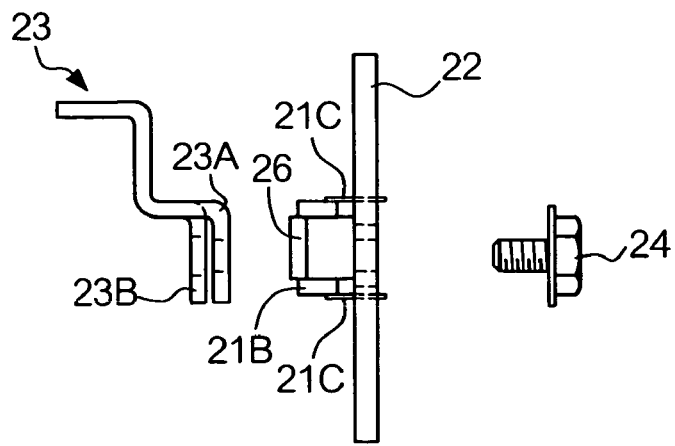
Figure 8:
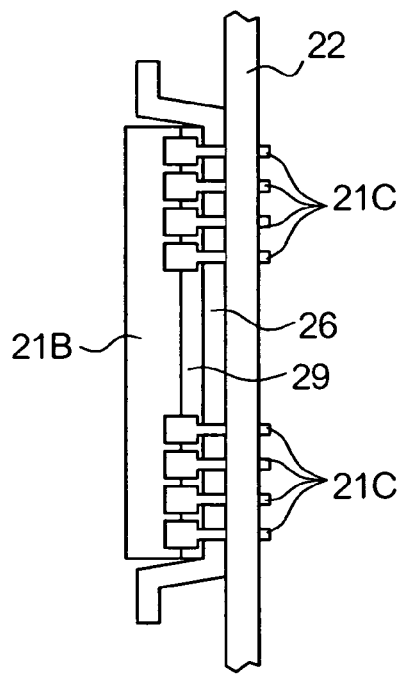
FIG. 8 is a schematic drawing illustrating circuit board 22 according to a modification of the same embodiment, wherein heat radiation unit 29 is placed between an image sensor and heat sink 26.
Figure 9:
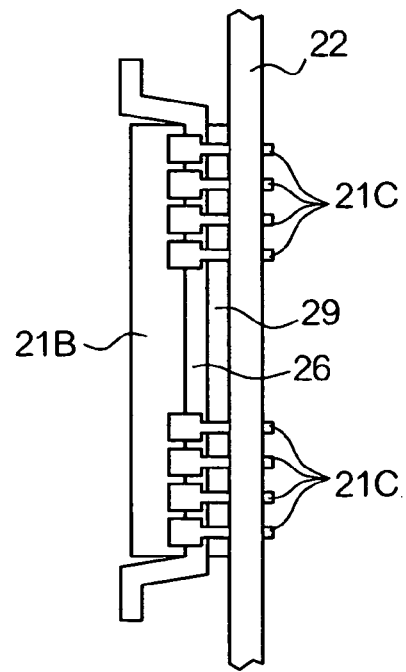
FIG. 9 is a schematic drawing illustrating circuit board 22 according to a modification of the same embodiment, wherein heat radiation unit 29 is placed between circuit board 22 and heat sink 26.
Figure 10:
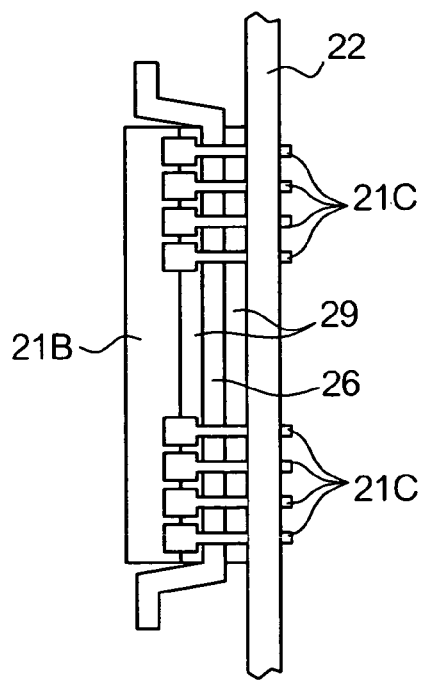
FIG. 10 is a schematic drawing illustrating circuit board 22 according to a modification of the same embodiment, wherein heat radiation units 29 are placed between an image sensor and heat sink 26 and between circuit board 22 and heat sink 26.

As shown in FIGS. 7a and 7b, heat sink 26 made of metal may be placed between image sensor 21 and circuit board 22, so as to reduce temperature rise of circuit board 22. According to this modification, expansion or contraction of circuit board 22 can be further reduced. Heat sink 26 may be placed on circuit board 22 or image sensor 21 in a non-glued state. According to this modification, heat sink 26 can be easily reduced, thus heat sink 26 can be easily recycled or reused. GND pattern 30 of circuit pattern on circuit board 22 may be disposed in a portion of circuit board 22 contacting with heat sink 26. A flat heat radiation unit may be made of, for example, silicone rubber, and be placed between heat sink 26 and image sensor 21 as shown in FIG. 8, or between heat sink 26 and circuit board 22 as shown in FIG. 9. In alternative, two flat heat radiation units may be placed between heat sink 26 and image sensor 21 and between heat sink 26 and image sensor 21 as shown in FIG. 10. Heat sink 26 made of metal has a limited surface flatness due to its machinery precision. Thus effective area of contact surface becomes less.

According to this modification, even if having a rough surface, the effective area of contact surface of the flat heat radiation unit can be enlarged by placing the flat heat radiation unit between them.

The positions of circular through hole 22A and oval through hole 22B, the positions of supporting portion 23A and supporting portion 23B are not limited to the configuration shown in FIG. 1, where they are disposed at opposite ends of the longitudinal direction of circuit board 22.

Figure 11:
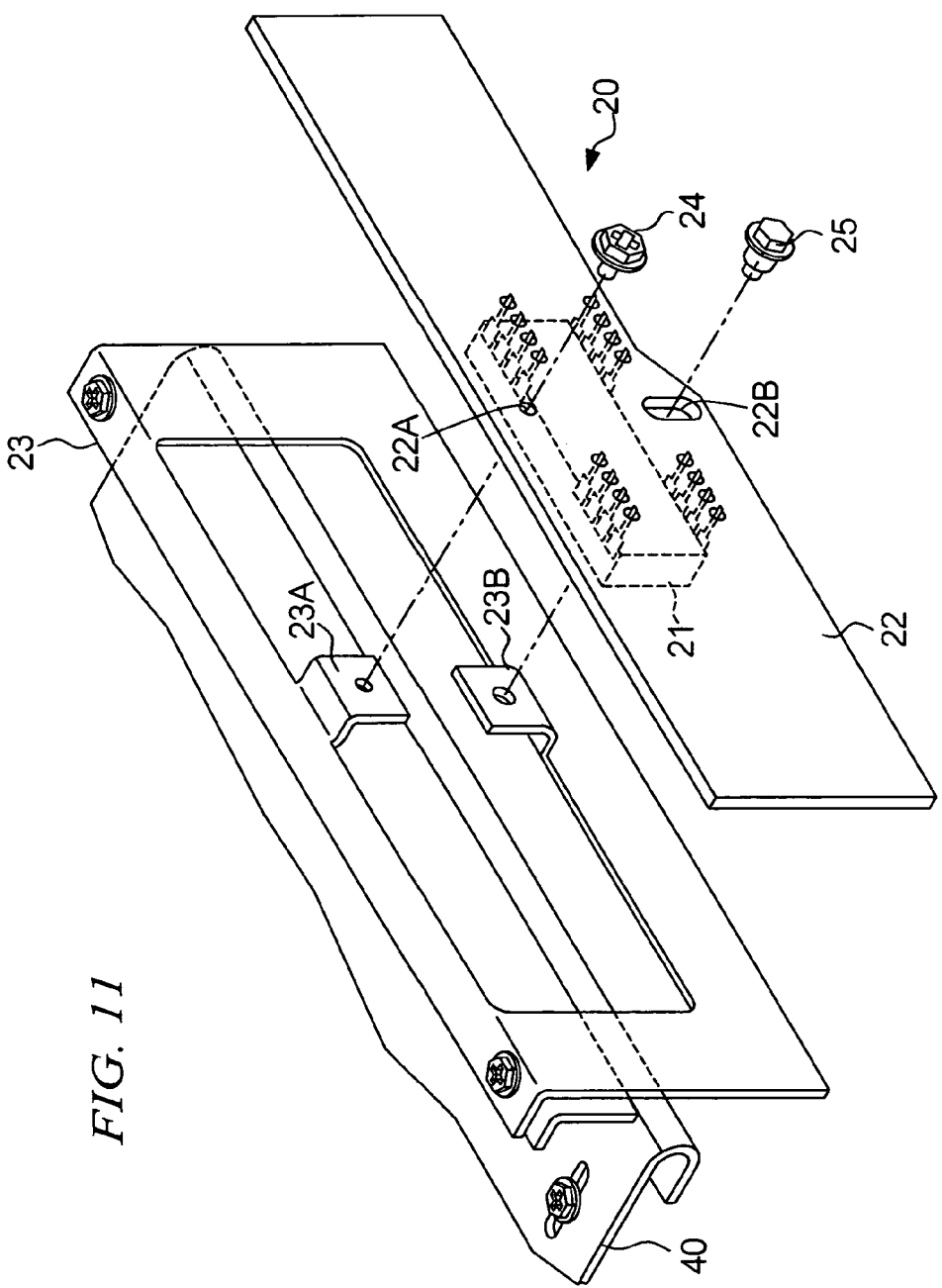
FIG. 11 is a schematic drawing illustrating a modification of the same embodiment, wherein circuit board 22 is secured at upper and lower side of a transverse direction of circuit board 22.

As illustrated in FIG. 11, these may be disposed along a transverse direction of circuit board 22, namely, upper and lower side of a transverse direction of image sensor 21.

Figure 12A:
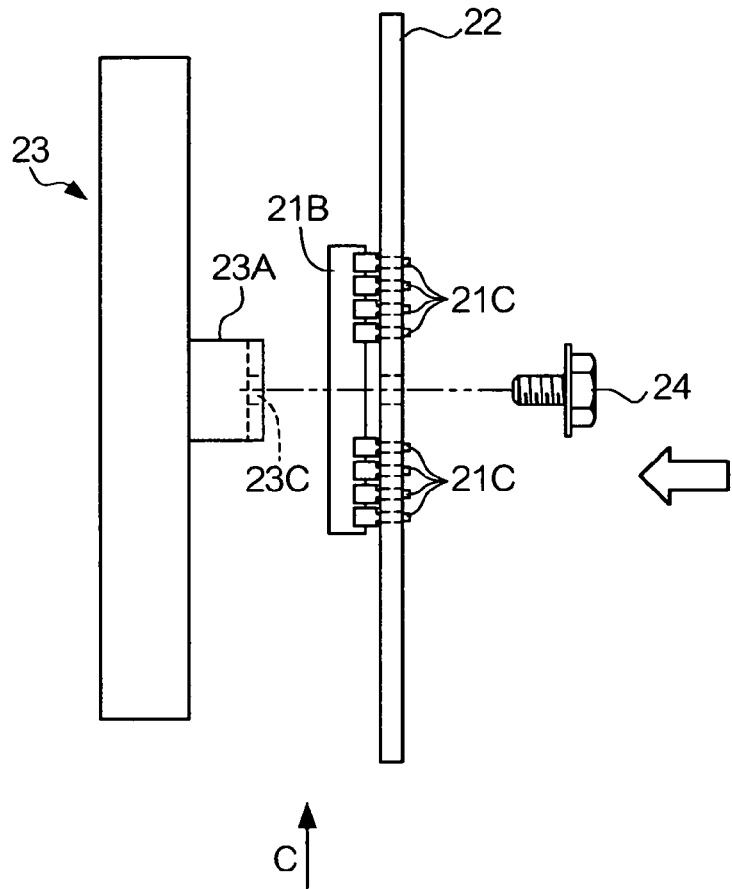
FIGS. 12a and 12b are drawings illustrating a modification of the same embodiment, wherein circuit board 22 is secured at upper and lower side of a transverse direction of circuit board 22.
Figure 12B:
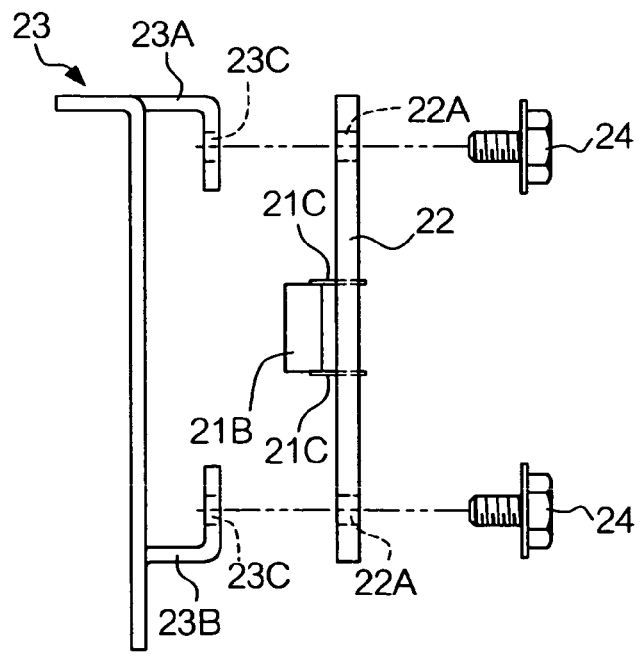

If supporting portion 23A and supporting portion 23B are disposed in upper and lower sides of a transverse direction of circuit board 22, respectively, protrusions of both supporting portion 23A and supporting portion 23B may be set to be equal, a circular through hole may be disposed on circuit board 22 in place of oval through hole 22B, and circuit board 22 may be secured to bracket 23 with two screws 24, as shown in FIGS. 12a and 12b. If two circular through holes 22A are disposed in upper and lower sides of a transverse direction of circuit board 22, the two circular through holes 22A may be disposed in such a manner that a line connecting the two circular through holes 22A aligns along the optical axis of lens unit 11. According to this modification, when a temperature of circuit board 22 changes, circuit board 22 expands or contracts in the left or right direction with respect to the line connecting the two circular through holes 22A. Accordingly, deviation in the position of image sensor 21 due to expansion/contraction of circuit board 22 can be reduced.

Figure 13A:
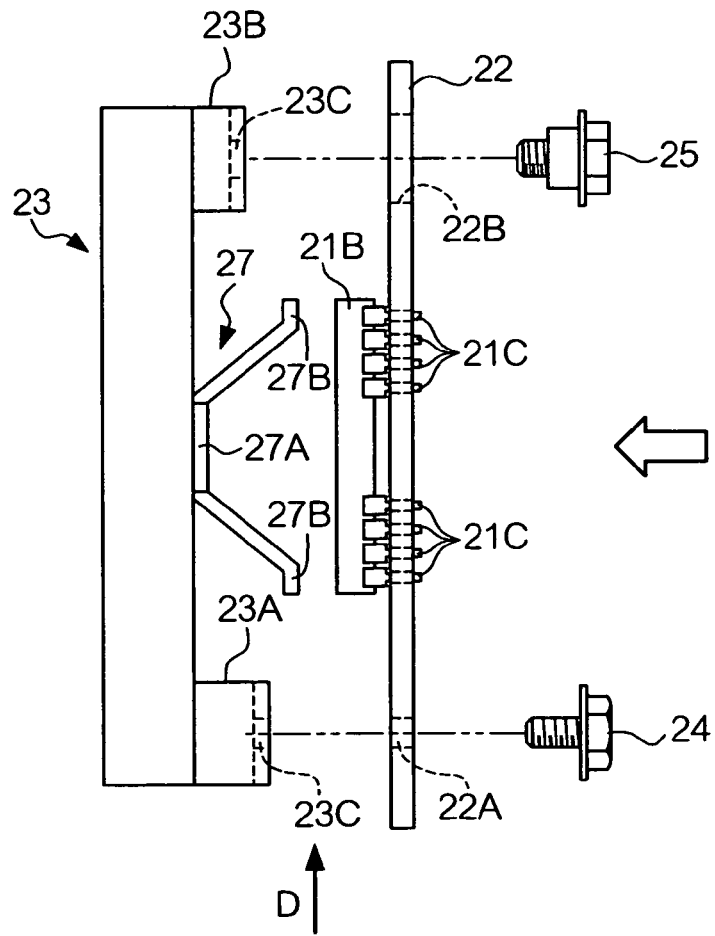
FIGS. 13a and 13b are drawings illustrating a modification of the same embodiment, wherein elastic member 27 presses against a circuit board.
Figure 13B:
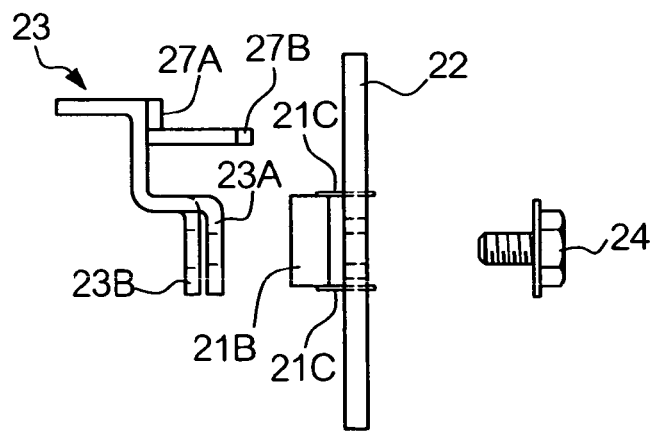

When elastic member 27 is installed on bracket 23 and circuit board 22 is installed on bracket 23 as shown in FIGS. 13a and 13b, circuit board 22 may be pressed with elastic member 27 in the opposite direction toward lens unit 11 along the optical axis of lens unit 11. Elastic member 27 has a square base portion 27A and spring portion 27B, and is, for example, formed from a metal plate pre-shaped by folding. When circuit board 22 is installed on bracket 23 on which elastic member 27 is installed, spring portion 27B of elastic member 27 is pressed by circuit board 22. When spring portion 27B is pressed by circuit board 22, spring portion 27B presses back circuit board 22 with a recovering force for recovering its original shape. When circuit board 22 is pressed by spring portion 27B, circuit board 22 moves in the opposite direction from lens unit 11 and is stopped by washer 25D of screw 25. According to this modification, vibrating motion of circuit board 22 can be reduced, thus, input image degradation due to the vibrating motion can be reduced.

Figure 14A:
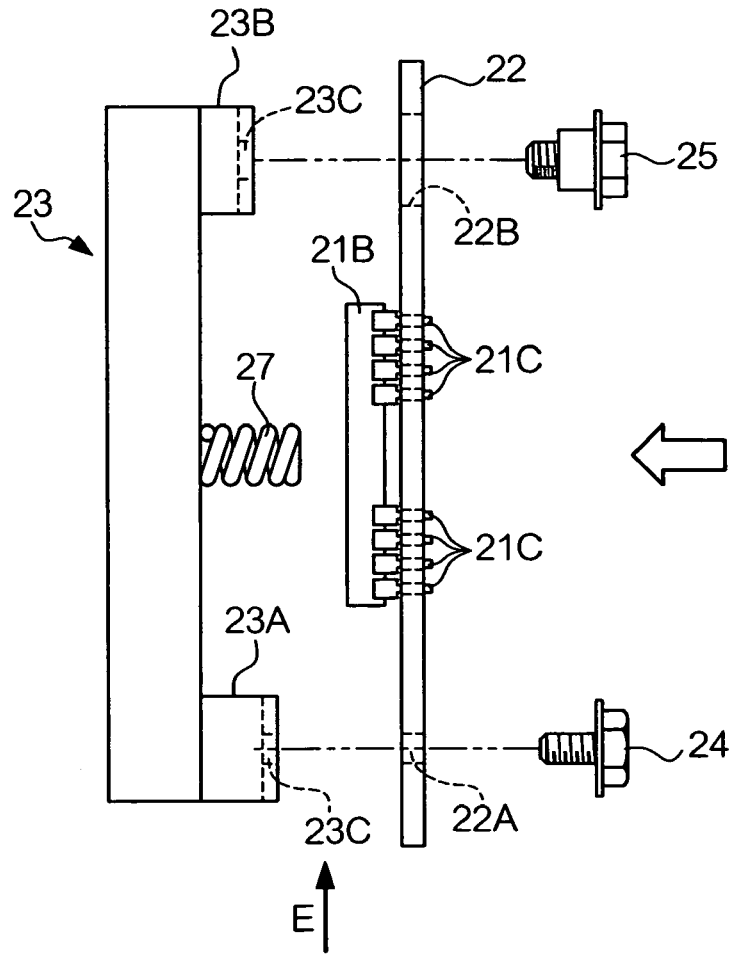
FIGS. 14a and 14b are drawings illustrating a modification of the same embodiment, wherein elastic member 27 has a coil spring shape.
Figure 14B:
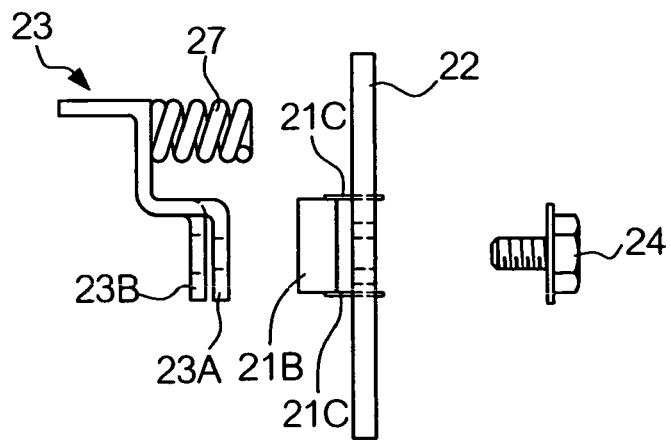
Figure 15A:
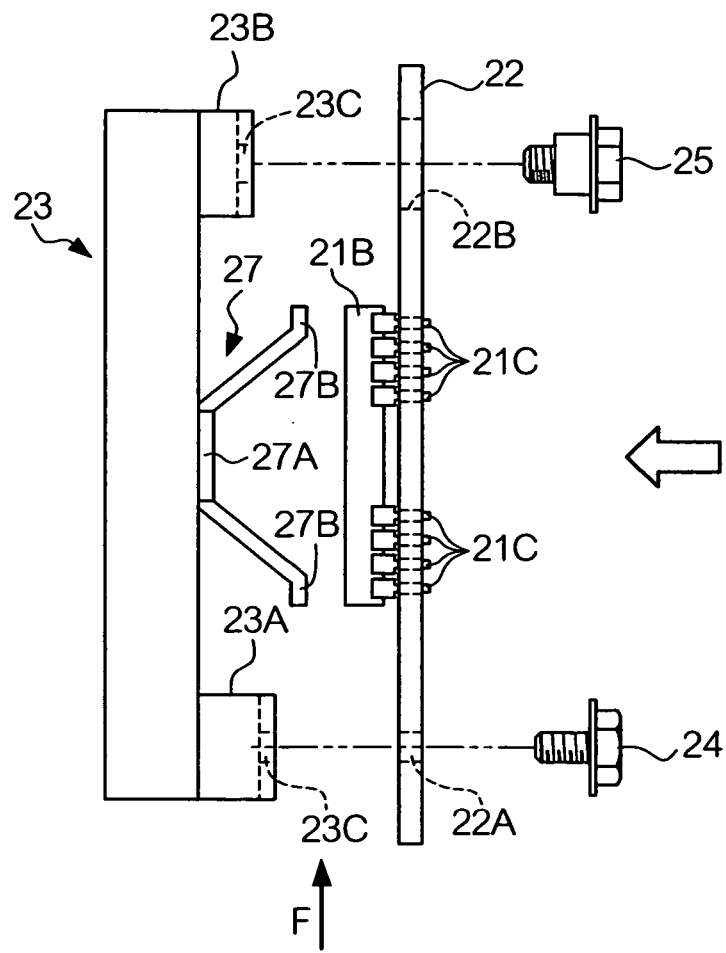
FIGS. 15a and 15b are drawings illustrating a modification of the same embodiment, wherein elastic member 27 presses against heat sink 26.
Figure 15B:
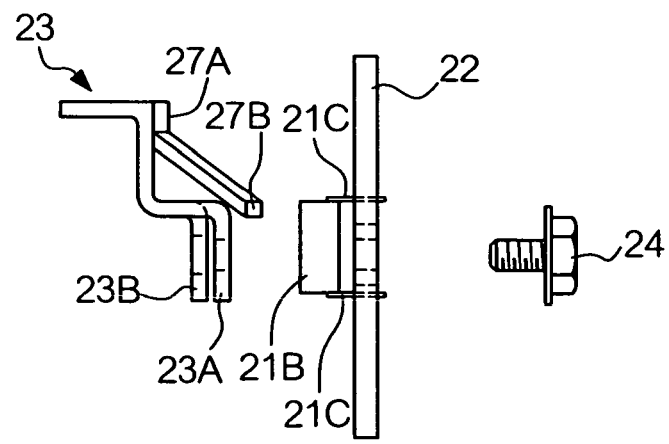
Figure 16A:
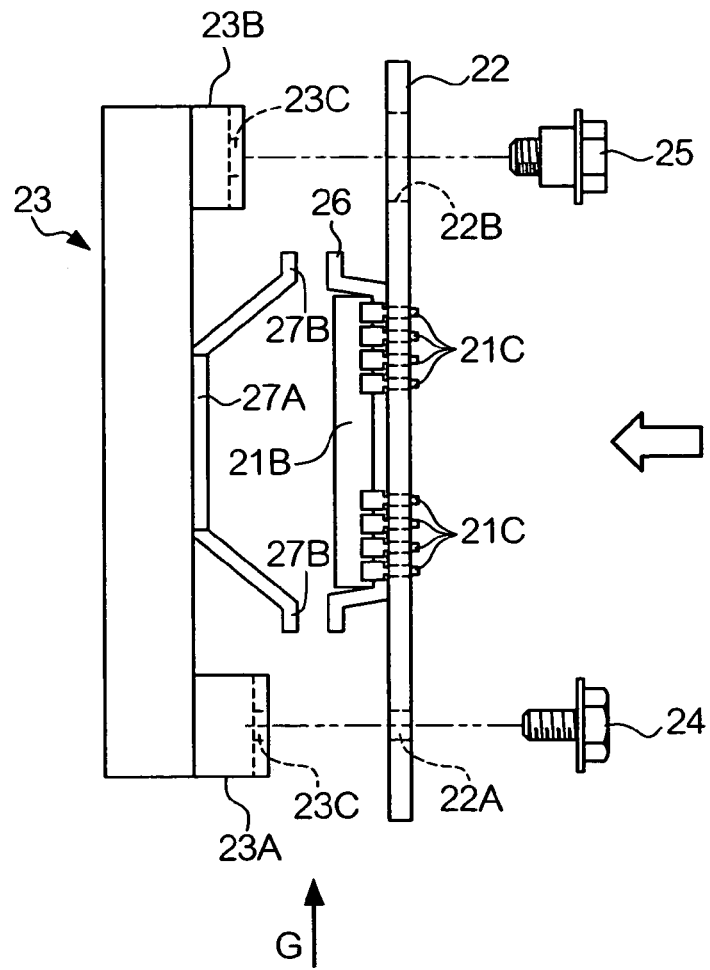
FIGS. 16a, 16b and FIGS. 17a, 17b are drawings illustrating a modification of the same embodiment, wherein elastic member 27 presses against heat sink 26.
Figure 16B:
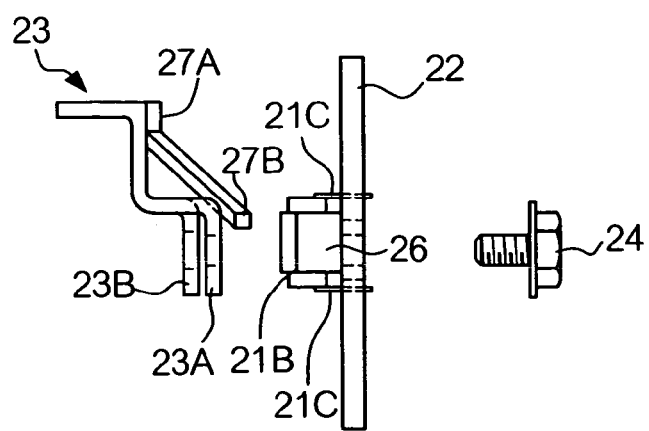
Figure 17A:
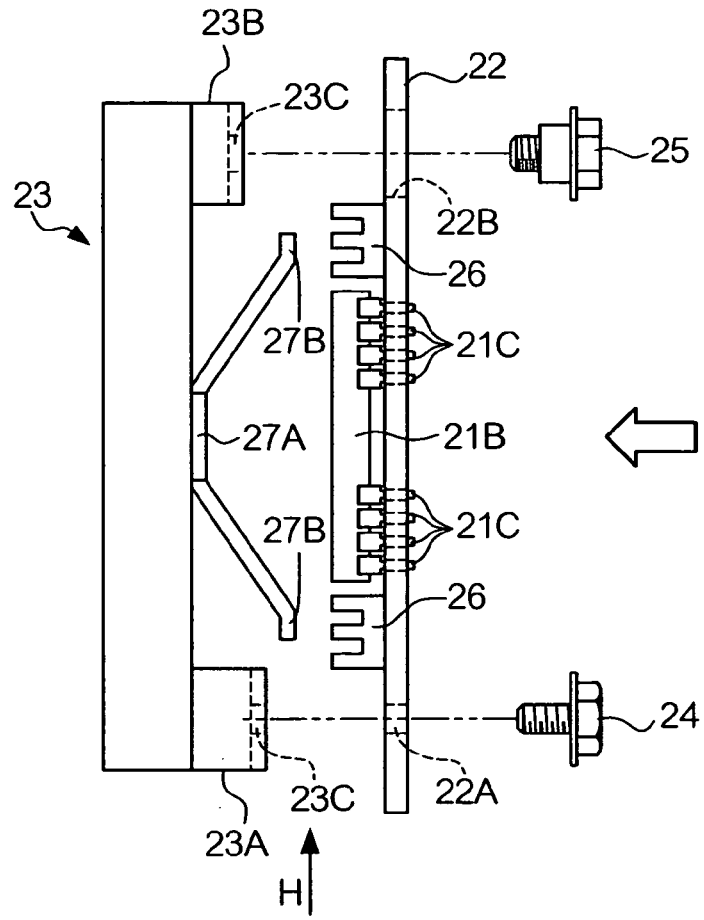
Figure 17B:
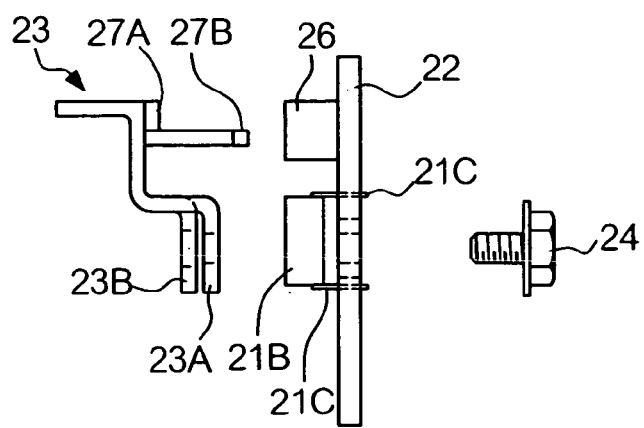
Figure 18A:
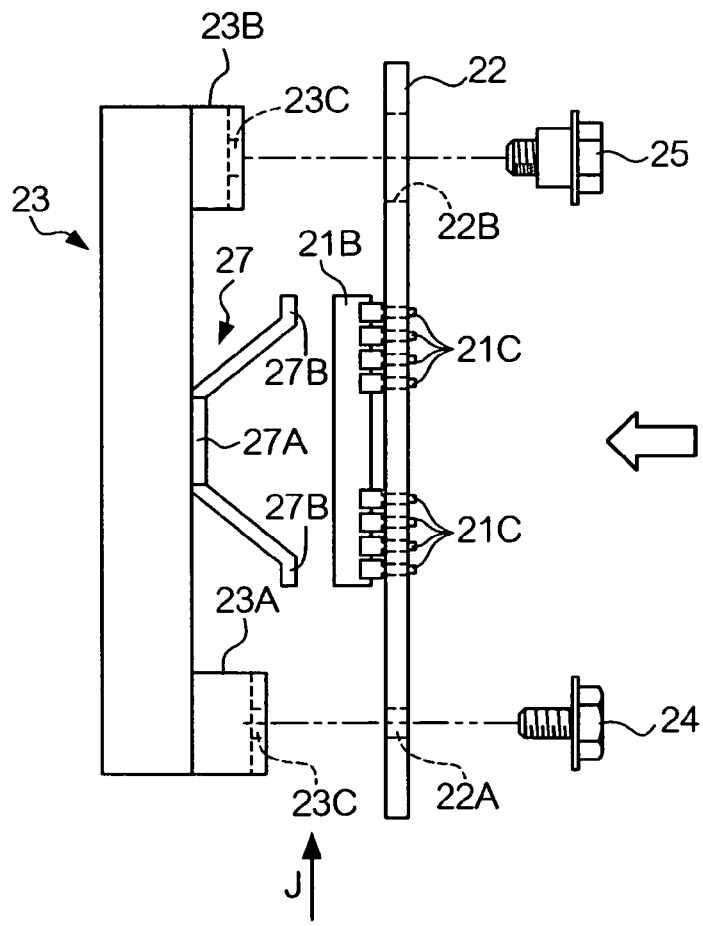
FIGS. 18a and 18b are drawings illustrating a modification of the same embodiment, wherein elastic member 27 presses against GND pattern 30 on circuit board 22.
Figure 18B:
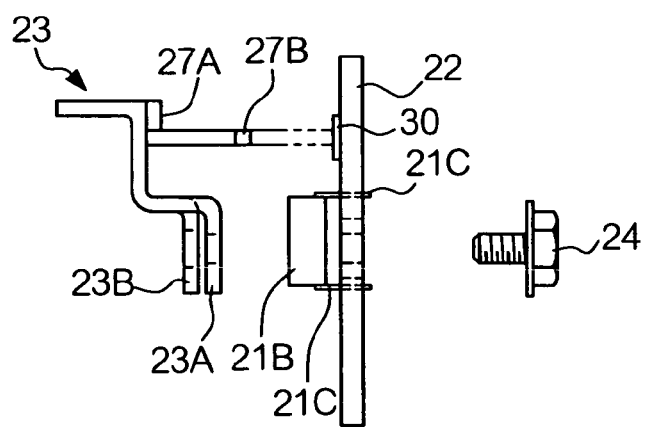

The shape of elastic member 27 enables it to press against circuit board 22, when circuit board 22 is installed on bracket 23. Elastic member 27 may have other shapes, such as a coil spring shape shown in FIGS. 14a and 14b, than the shape shown in FIGS. 13a and 13b. Elastic member 27 may be made of elastic material other than metal such as plastics or rubber As shown in FIGS. 15a and 15b, elastic member 27 may press against package 21B of image sensor 21 installed on Circuit board 22. As described above, in the case of installing heat sink 26, elastic member 27 may press against heat sink 26, as shown in FIGS. 16a and 16b and FIGS. 17a and 17b. In a case that elastic member 27 is made of electro-conductive metal, GND pattern 30 of the circuit pattern may be formed on circuit board 22 in the portion contacting elastic member 27, as shown in FIGS. 18a and 18b. According to this modification, GND pattern of the circuit pattern, electro-conductive elastic member 27, bracket 23 made of metal, and base unit 40 are electrically connected, thus effective area of GND pattern 30 on circuit board 22 is enlarged. Accordingly, electromagnetic noise from circuit board 22 can be reduced.

Circuit board 22 may be secured and supported in a manner other than that described above. For example, supporting portion 23B may be formed in an L-shape rather than in a staircase shape shown in FIG. 1.

Then the lower surface of an end portion of circuit board 22 may be supported by the L-shaped supporting portion 23B. While one end portion of circuit board 22 is secured with screw 24, the lower surface of the opposite end portion of circuit board 22 may be supported by the screw screwed into bracket 23.

Second Embodiment

An image input apparatus according to a second embodiment of the present invention will be described.

Figure 19:
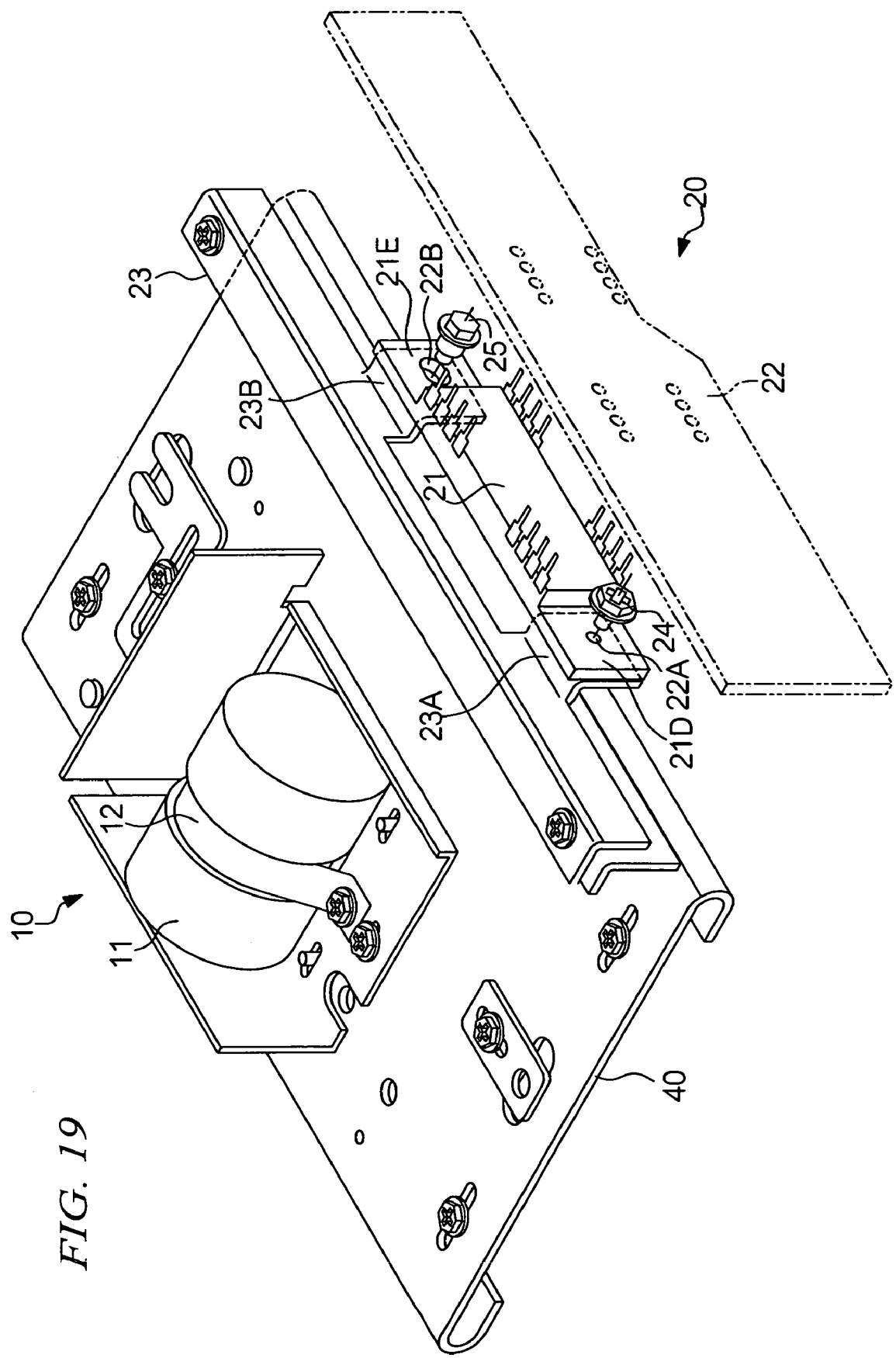
FIG. 19 a perspective drawing illustrating a significant part of an image input apparatus according to a second embodiment of the present invention.

FIG. 19 is a perspective drawing illustrating a significant part of an image input apparatus according to a second embodiment of the present invention. Same references are used for the same component as in the first embodiment.

As shown in FIG. 19, the image input apparatus according to the second embodiment differs from that of the first embodiment in that image sensor 21 is installed on bracket 23 with screw 24 and screw 25, instead of on circuit board 22.

As shown in FIG. 19, package 21B of image sensor 21 has package supporting portion 21D having circular through hole 22A and package supporting portion 21E having oval through hole 22B. The height of package supporting portion 21E is less than the height of unthreaded portion 25B of screw 25. According to the present embodiment, image sensor 21 having the shape shown in FIG. 19 is installed on circuit board 22 by soldering. Since circular through hole 22A and oval through hole 22B are disposed on image sensor 21, no circular through hole 22A or oval through hole 22B is disposed on circuit board 22 in the second embodiment.

Supporting portion 23A and supporting portion 23B are disposed on a different portion of bracket 23 from that of the first embodiment.

According to the present embodiment, supporting portion 23A and supporting portion 23B are disposed in such a manner that an image is focused image sensor 21 by lens unit 11 when image sensor 21 is installed on supporting portion 23A and supporting portion 23B. In the second embodiment, supporting portion 23A and supporting portion 23B also have threaded screw hole 23C, as in the first embodiment Image sensor 21 installed on circuit board 22 is secured to bracket 23 as follows. First, screw 24 is inserted into circular through hole 22A of package supporting portion 21D, and screwed into threaded screw hole 23C. Accordingly, image sensor 21 is secured to supporting portion 23A of bracket 23. Since supporting portion 23A protrudes further than supporting portion 23B in this configuration, a gap exists between image sensor 21 and supporting portion 23B.

Next, screw 25 is inserted into oval through hole 22B, and threaded portion 25A of screw 25 is screwed into threaded screw hole 23C of supporting portion 23B. Accordingly, a position of image sensor 21 is determined, and it is supported by screw 25. Since the diameter of unthreaded portion 25B is larger than the diameter of threaded screw hole 23C, installation of sleeve screw 25 is stopped at the edge surface 25C of unthreaded portion 25B, when threaded portion 25A is screwed into threaded screw hole 23C. Since the height of unthreaded portion 25B in the axial direction is larger than the thickness of circuit board 22, even when sleeve screw 25 is screwed into threaded screw hole 23C and the vicinity portion of oval through hole 22B, package supporting portion 21E is pressed toward bracket 23 with washer 25D, package 21B is not pressed against supporting portion 23B and the gap between package 21B and supporting portion 23B is maintained. Since the smallest diameter of oval through hole 22B is larger than the diameter of unthreaded portion 25B, package supporting portion 21E is movable while pressed against bracket 23 by the end surface of washer 25D. Sleeve screw 25 may be screwed into threaded screw hole C without pressing against package supporting portion 21E with washer 25D by elongating the height of unthreaded portion 25B in the axial direction. According to this modification, package supporting portion 21E is movable also in the opposite direction from bracket 23

In the above-described configured image input apparatus, package 21B of image sensor 21 is secured in an end portion of the package 21B and is movably supported in another end portion. Accordingly, when temperature of package 21B changes and package 21B expands or contracts, bending of package 21B can be reduced. Since bending of package 21B is reduced, the deviation in position of image sensor 21 along the optical axis of lens unit 11 can be reduced. Accordingly, degradation of the input image can be reduced. In the present embodiment, circuit board 22 is not secured with a fastening member such as a screw. Accordingly, when temperature of circuit board 22 changes and circuit board 22 expands or contracts, it does not bend. Thus, deviation in position of image sensor 21 can be suppressed along the optical axis of lens unit 11

Modification To Second Embodiment

Similar to a modification of the first embodiment, image sensor 21 may have reference imaging device element 21A, which is used as a reference point for capturing a focused image.

Reference imaging device element 21A may be disposed on the same end of bracket 23 as circular through hole 22A In the example shown in FIG. 1, a first segment of image sensor 21 acts as reference imaging device element 21A When a temperature of package 21B changes, it expands in the direction of arrow B, or contracts in the direction of arrow A, as shown in FIG. 1. According to this modification, the deviation in a position of a first segment of image sensor 21 is reduced, and degradation of input image quality due to temperature change can be reduced.

In a second embodiment, threaded portion 25A and unthreaded portion 25B of screw 25 may have the same diameter, as shown in FIG. 5. Screw 25 may have no unthreaded portion 25B. Any shape of screw able to support package 21B when inserted into oval through hole 22B may be employed in place of sleeve screw 25.

Figure 20:
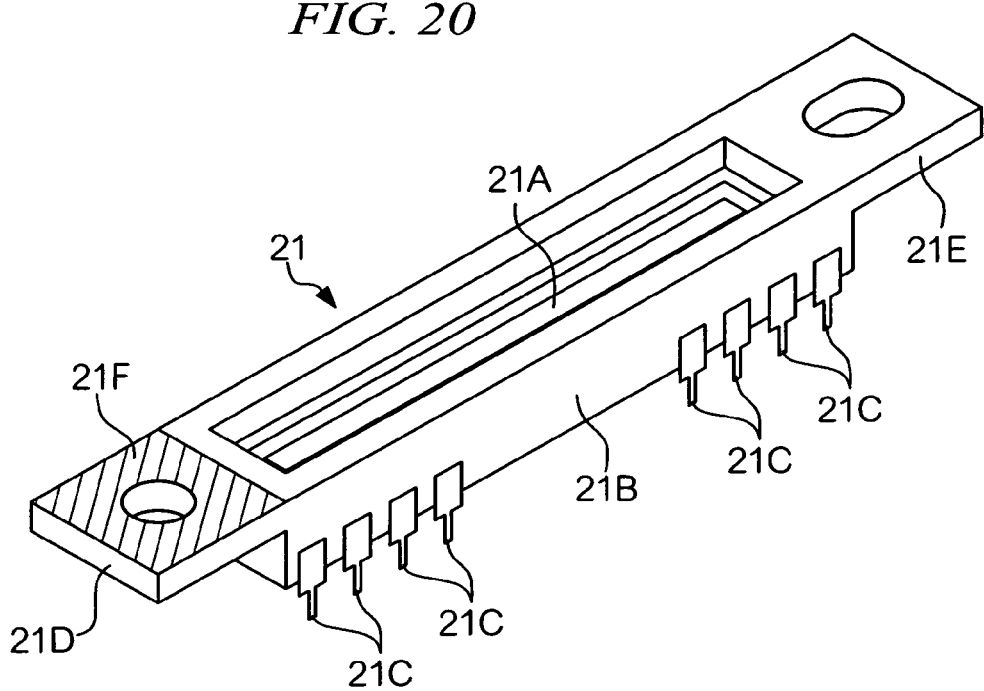
FIG. 20 is a perspective drawing illustrating an image input apparatus according to a modification of the same embodiment, wherein GND pattern 21F is formed on package 21B in the portion pressed against supporting member 23A of bracket 23.

GND pattern 21F of image sensor 21 may be formed on package 21B in the portion pressed against supporting portion 23A bracket 23 with screw 24. As shown in FIG. 20, GND pattern 21F of image sensor 21 may be formed on package 21B in the portion contacting screw 24. According to this modification, GND pattern 21F of image sensor 21, bracket 23 made of metal, and base unit 40 are electrically connected, thus an effective area of GND pattern on circuit board 22 is enlarged. Accordingly, electromagnetic noise from circuit board 22 can be reduced.

Figure 21:
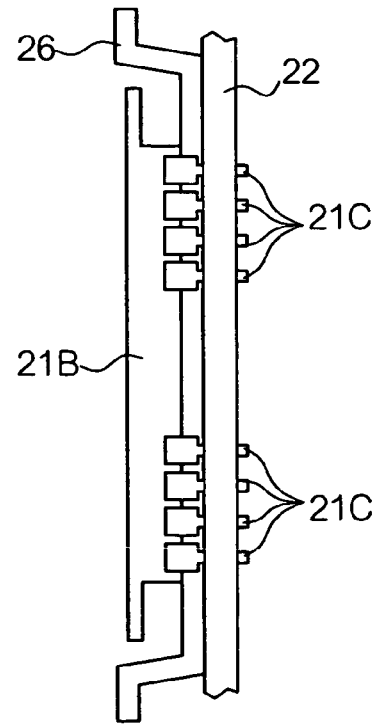
FIG. 21 is a schematic drawing illustrating circuit board 22 according to a modification of the same embodiment, wherein heat sink 26 is placed.

As shown in FIG. 21, heat sink 26 may be placed between image sensor 21 and circuit board 22. GND pattern of circuit pattern may be formed on circuit board 22 in the portion contacting heat sink 26.

Figure 22:
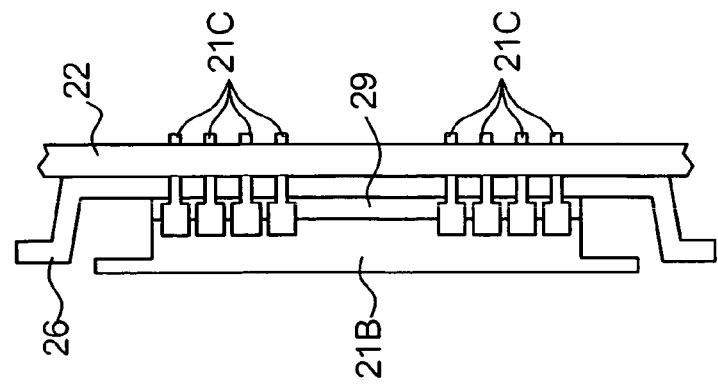
FIG. 22 is a schematic drawing illustrating circuit board 22 according to a modification of the same embodiment, wherein heat radiation unit 29 is placed between an image sensor and heat sink 26.
Figure 23:
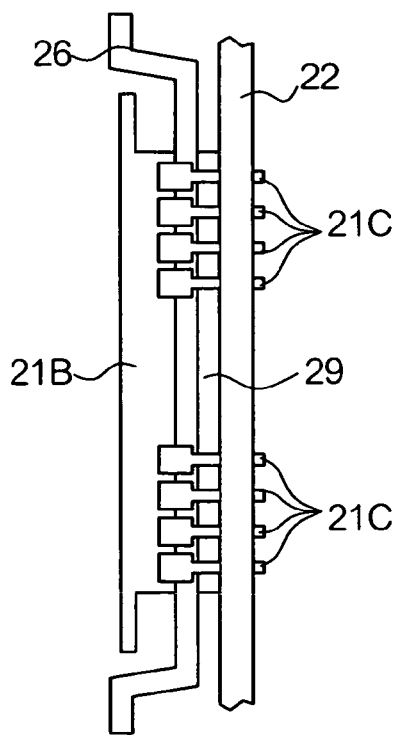
FIG. 23 is a schematic drawing illustrating circuit board 22 according to a modification of the same embodiment, wherein heat radiation unit 29 is placed between circuit board 22 and heat sink 26.
Figure 24:
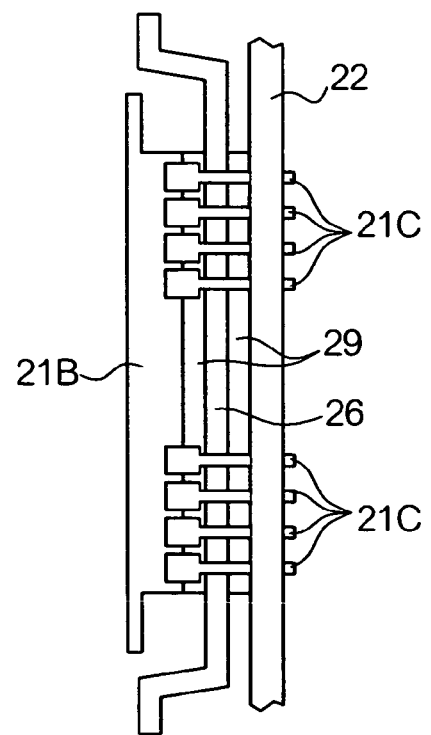
FIG. 24 is a schematic drawing illustrating circuit board 22 according to a modification of the same embodiment, wherein heat radiation units 29 are placed between an image sensor and heat sink 26 and between circuit board 22 and heat sink 26.

As shown in FIGS. 22 to 24, a flat heat radiation unit may be placed between circuit board 22 and heat sink 26 and/or between image sensor 21 and heat sink 26.

Figure 25:
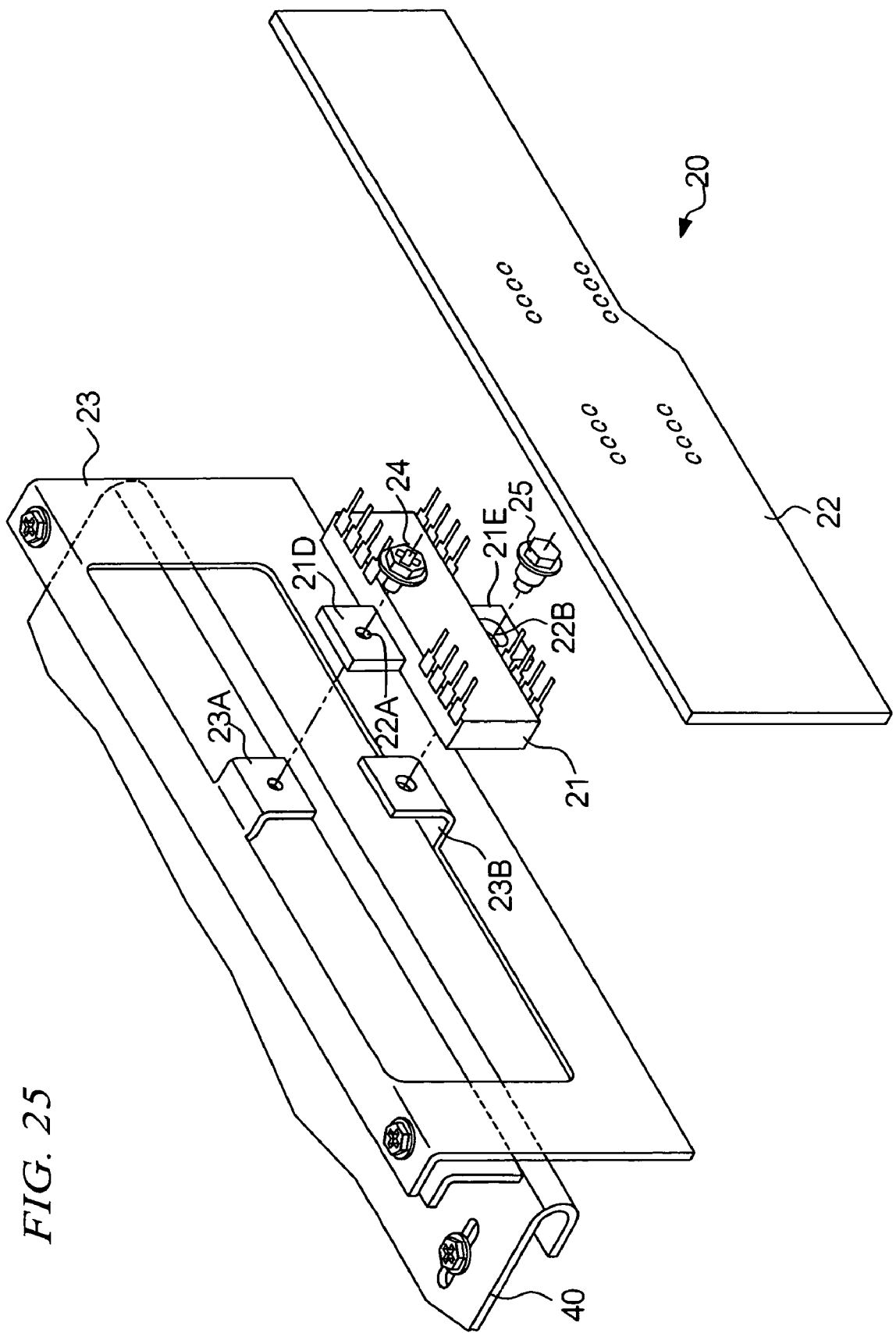
FIG. 25 is a drawing illustrating a modification of the same embodiment, wherein an image sensor is supported at upper and lower sides of a transverse direction of the image sensor.

Circular through hole 22A and oval through hole 22B, and supporting portion 23A and supporting portion 23B may be disposed in a position other than left and right sides of longitudinal direction of package 21B shown in FIG. 19. For example, as shown in FIG. 25, these may be disposed in the upper and lower sides of a transverse direction of package 21B, namely in the upper and lower sides of a transverse direction of image sensor 21.

Figure 26A:
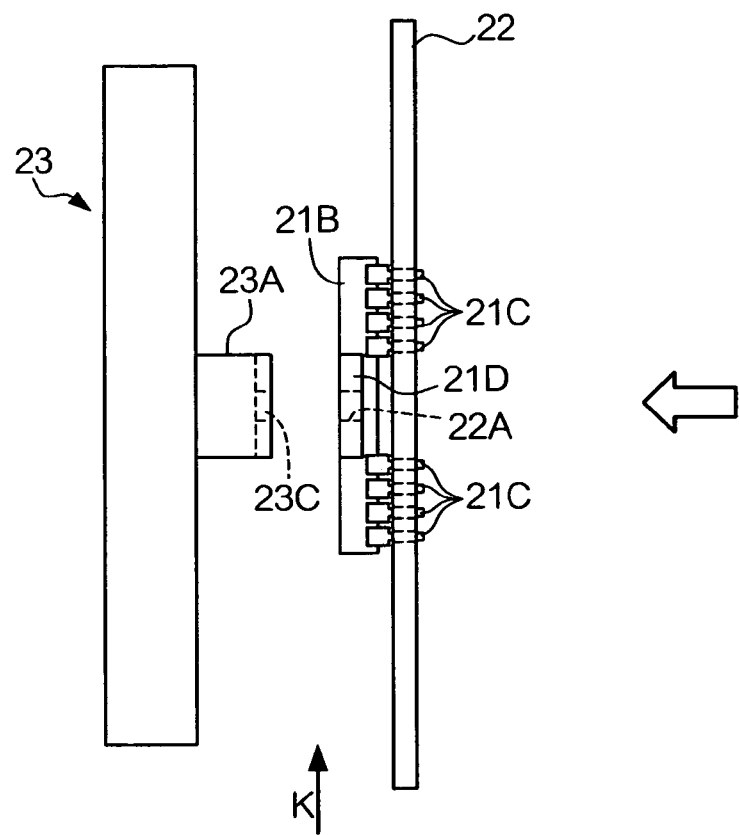
FIGS. 26a and 26b are schematic drawings illustrating a modification of the same embodiment, wherein an image sensor is secured at upper and lower sides of a transverse direction of the image sensor.
Figure 26B:
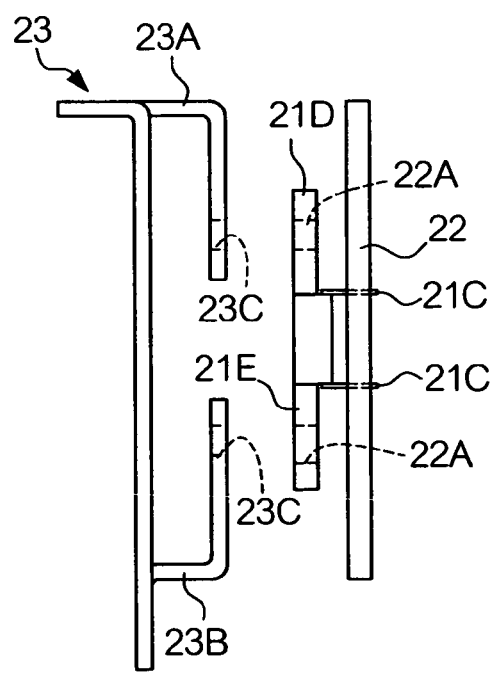

In the example shown in FIGS. 26a and 26b supporting portion 23A and supporting portion 23B are disposed in the upper and lower sides of a lo transverse direction of package 21B, respectively. In this example, supporting portion 23A and supporting portion 23B may set to protrude the same degree. Another circular through hole 22A may be disposed on package 21B instead of oval through hole 22B. Accordingly, package 21B can be secured on bracket 23 with two screws 24. Two circular through holes 22A may be disposed in upper and lower sides of a transverse direction of package 21B in such a manner that the optical axis of lens unit 11 is aligned along the line connecting the two circular through holes 22A. According to this modification, package 21B expands or contracts in the left or right direction with respect to the line connecting two circular through holes 22A, when temperature of package 21B changes. Accordingly, the deviation in the position of image sensor 21 may be reduced, when package 21B expands or contracts.

Figure 27A:
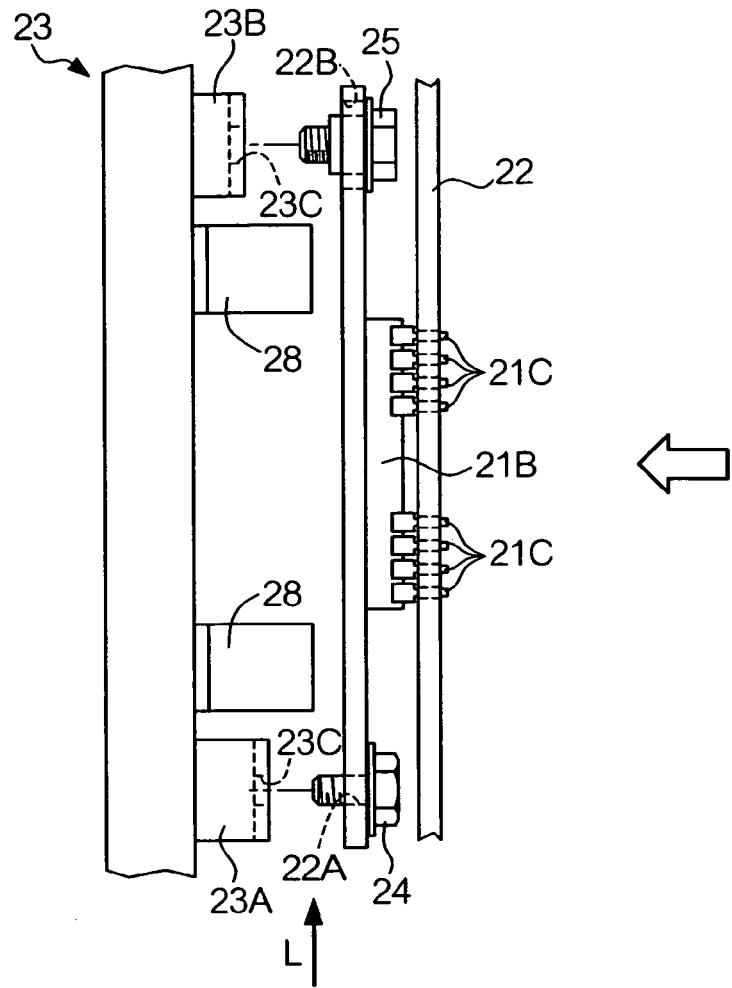
FIGS. 27a and 27b are schematic drawings illustrating a modification of the same embodiment, wherein elastic member 27 presses against an image sensor.
Figure 27B:
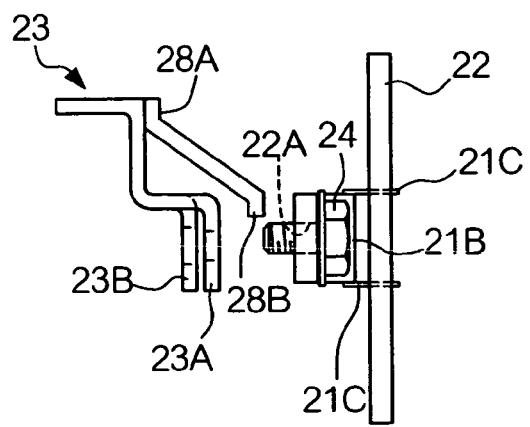

As shown in FIGS. 27a and 27b, when elastic member 28 is installed on bracket 23 and package 21B is installed on bracket 23, package 21B may be pressed by elastic member 28 in the opposite direction to lens unit 11 along the optical axis lens unit 11. Elastic member 28 has a square base portion 28A and spring portion 28B, and is, for example, made of a pre-shaped folded metal plate. When elastic member 28 is installed on bracket 23 and package 21B is installed on bracket 23, spring portion 28B of elastic member 28 is pressed by package 21B. When spring portion 28B is pressed by packaged portion 21B, spring portion 28B presses back packaged portion 21B with a recovering force for recovering its original shape. When packaged portion 21B is pressed by spring portion 28B, packaged portion 21B deviates in the opposition direction from lens unit 11, and is stopped by washer 25D of screw 25. According to this modification, vibrating motion of packaged portion 21B can be reduced. Accordingly, degradation of image due to vibrating motion of packaged portion 21B can be reduced.

Elastic member 28 may have other shapes rather than the shape shown in FIGS. 27a and 27b. Elastic member 28 may have other shapes able to press against package 21B when elastic member 28 is installed on bracket 23, and may have a coil spring shape as described in the first embodiment.

Figure 28A:
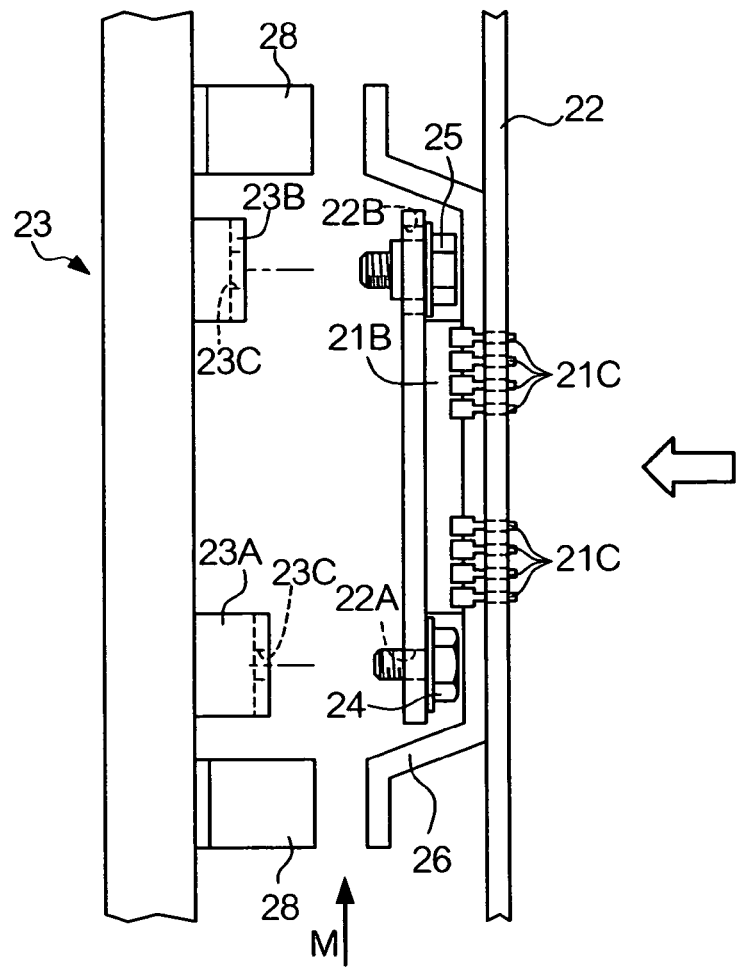
FIGS. 28a and 28b are schematic drawings illustrating a modification of the same embodiment, wherein elastic member 27 presses against heat sink 26.
Figure 28B:
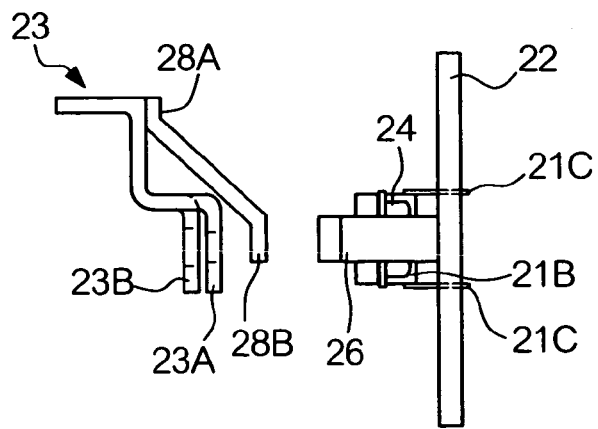

Elastic member 28 may be made from other materials, such as plastics or rubber, rather than metal. As described above, for installation of heat sink 26, heat sink 26 may be pressed by elastic member 28, as shown in FIGS. 28a and 28b. In the case that elastic member 28 is made of electro-conductive metal, GND pattern 21F for image sensor 21 may be formed on package 21B in the portion contacting with elastic member 28. According to this modification, GND pattern 21F for image sensor 21, electro-conductive elastic member 28, bracket 23 made of metal, and base unit 40 are electrically connected, thus an effective area of GND pattern for image sensor 21 is enlarged. Accordingly, electromagnetic noise from circuit board 22 can be reduced.

Package 21B can be secured or supported in other way than those of described above. For example, package supporting portion 21E is formed in an L-shape rather than in a staircase shape shown in FIG. 1. Then, the lower surface of an end portion of package 21B may be supported by the L-shaped package supporting portion 21E. The lower surface of the end portion of package 21B may also be supported by the screw screwed into bracket 23.

The foregoing description of the embodiments of the present invention has been provided for the purpose of illustration and description. It is not intended to be exclusive or to limit the invention to the precise forms disclosed. Obviously, many modifications and variations will be apparent to person skilled in the art. The embodiments were chosen and described in order to best explain the principles of the invention and its practical applications, thereby enabling others skilled in the art to understand the invention for various embodiments and with the various modifications as are suited the particular use contemplated. It is intended that the scope of the invention be defined by the following claims and their equivalents.

What is claimed is:

1. An image input apparatus, comprising:
a board having an image sensor, a circular through hole and an oval through hole;
a supporting member having a first supporting portion and a second supporting portion, the first supporting portion having a first threaded screw hole, the second supporting portion having a second threaded screw hole;
a first screw; and
a second screw, wherein
the board is rigidly secured on the first supporting portion with the first screw which is inserted into the circular through hole and is screwed into the first threaded screw hole of the first supporting portion,
the board is movably supported on the second screw which is inserted into the oval through hole and is screwed into the second threaded screw hole of the second supporting portion,
the image sensor comprises a reference imaging device element providing a reference point for an image inputting process, and
the circular through hole is disposed in a vicinity of the reference imaging device element.

2. The image input apparatus according to claim 1, wherein the board has a rectangular footprint, the circular through hole is disposed in an end portion of a long axis of the board, and
the oval through hole is disposed in another end portion of a long axis of the board.

3. The image input apparatus according to claim 1, wherein the board has a rectangular footprint,
the circular through hole is disposed in an end portion of a short axis of the board, and
the oval through hole is disposed in another end portion of a short axis of the board.

4. The image input apparatus according to claim 1, wherein the supporting member is electro-conductive,
a circuit pattern including a ground pattern is formed on the board, and
the ground pattern of the circuit pattern is disposed on the board in the portion contacting the first supporting portion.

5. The image input apparatus according to claim 1, further comprising:
a lens for focusing light on the image sensor; and
an elastic member installed on the supporting member,
wherein the elastic member presses against the circuit board in the direction of the optical axis of the lens.

6. The image input apparatus according to claim 5, wherein a circuit pattern including a ground pattern is formed on the board, the supporting member and the elastic member are electro-conductive, and
the elastic member presses against the ground pattern of the circuit pattern disposed on the board.

7. The image input apparatus according to claim 1, further comprising:
a lens for focusing light on the image sensor;
an elastic member installed on the supporting member; and
a heat sink installed on the board,
wherein
the elastic member presses against the heat sink installed on the board in the direction of the optical axis of the lens.

8. The image input apparatus according to claim 1, wherein a heat sink is placed between the board and the image sensor in a non-glued state.

9. The image input apparatus according to claim 8, wherein a flat heat radiation unit is placed between the heat sink and the image sensor or between the heat sink and the board; or
flat heat radiation units are placed between the heat sink and the image sensor and between the heat sink and the board.

10. An image input apparatus, comprising:
an image sensor having a packaged portion, a circular through hole and an oval through hole;
a supporting member having a first supporting portion and a second supporting portion, the first supporting portion having a first threaded screw hole, the second supporting portion having a second threaded screw hole;
a first screw; and
a second screw,
wherein
the packaged portion is rigidly secured on the first supporting portion of the supporting member with the first screw installed in the first supporting portion,
the packaged portion is movably supported on the second supporting portion of the supporting member by the second screw installed in the second supporting portion,
the peripheral portion around the circular through hole is secured on the first supporting portion with the first screw being inserted into the circular through hole the first screw being screwed into the first threaded screw hole of the first supporting portion, the packaged portion is supported by a second screw being inserted into the oval through hole, the second screw being screwed into the second threaded screw hole of the second supporting portion, the image sensor comprises a reference imaging device element providing a reference point for an image inputting process, and the circular through hole is disposed in a vicinity of the reference imaging device element.

11. The image input apparatus according to claim 10, wherein the packaged portion has a rectangular footprint, the circular through hole is disposed in an end portion of a long axis of the packaged portion, and the oval through hole is disposed in another end portion of a long axis of the packaged portion.

12. The image input apparatus according to claim 10, wherein the packaged portion has a rectangular footprint, the circular through hole is disposed in an end portion of a short axis of the packaged portion, and the oval through hole is disposed in another end portion of a short axis of the packaged portion.

13. The image input apparatus according to claim 10, wherein the supporting member is electro-conductive, an electro-conductive portion is disposed on the packaged portion in the portion contacting the first supporting portion, and the electro-conductive portion is electrically connected to a ground pattern on the image sensor.

14. The image input apparatus according to claim 10, further comprising:

a lens for focusing light on the image sensor, wherein the peripheral portion around the oval through hole is pressed by the edge surface of the second screw in the direction of the optical axis of the lens.

15. The image input apparatus according to claim 14, wherein the second screw has a threaded portion and an unthreaded portion, and the diameter of the unthreaded portion is larger than the diameter of the threaded portion.

16. The image input apparatus according to claim 10, further comprising:

a lens for focusing light on the image sensor; and an elastic member installed on the supporting member, wherein the elastic member presses against the packaged portion of the image sensor in the direction of the optical axis of the lens.

* * * * *